United States Patent
Hara et al.

(10) Patent No.: US 8,055,215 B2
(45) Date of Patent: Nov. 8, 2011

(54) TRANSMISSION CIRCUIT AND COMMUNICATION DEVICE

(75) Inventors: Yoshihiro Hara, Osaka (JP); Shunsuke Hirano, Kanagawa (JP); Toru Matsuura, Osaka (JP); Shigeru Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 12/100,856

(22) Filed: Apr. 10, 2008

(65) Prior Publication Data

US 2008/0261543 A1     Oct. 23, 2008

(30) Foreign Application Priority Data

Apr. 11, 2007   (JP) .................................. 2007-104274

(51) Int. Cl.
   *H04B 1/04* (2006.01)
(52) U.S. Cl. ..................... 455/114.2; 455/102; 455/108; 455/110; 455/115.3; 455/125; 455/126; 455/127.2; 375/296; 375/297
(58) Field of Classification Search .................... 455/91, 455/102, 108, 110, 113, 114.1–114.3, 115.1, 455/115.2, 115.3, 125, 126, 127.2; 375/296, 375/297
See application file for complete search history.

(56) References Cited

U.S. PATENT DOCUMENTS

| | | | |
|---|---|---|---|
| 7,092,683 B2* | 8/2006 | Tanaka et al. | 455/108 |
| 7,212,791 B2* | 5/2007 | Arayashiki | 455/91 |
| 7,555,057 B2* | 6/2009 | Staszewski et al. | 375/296 |
| 7,792,214 B2* | 9/2010 | Matsuura et al. | 375/297 |
| 2006/0205366 A1* | 9/2006 | Arayashiki | 455/91 |
| 2006/0234652 A1* | 10/2006 | Oka | 455/102 |
| 2007/0093218 A1* | 4/2007 | Nagel | 455/114.3 |
| 2007/0142000 A1* | 6/2007 | Herzinger | 455/91 |

FOREIGN PATENT DOCUMENTS

JP     2006-197368     7/2006

OTHER PUBLICATIONS

Raab et al., "High-Efficiency L-Band Kahn-Technique Transmitter", 1998. *IEEE MTT-S int. Microwave Symp. Digest*, pp. 585-588, 1998.

* cited by examiner

*Primary Examiner* — Junpeng Chen
(74) *Attorney, Agent, or Firm* — Wenderoth, Lind & Ponack, L.L.P.

(57) ABSTRACT

Provided is a transmission circuit capable of operating with high linearity and with low noise. An AM variable fc filter uses an AM cutoff frequency to remove a high frequency component from an amplitude signal. An amplifier supplies a power amplifier with a voltage which is a result of amplifying the amplitude signal outputted from the AM variable fc filter. A PM variable fc filter uses a PM cutoff frequency to remove a high frequency component from a phase signal. A phase modulator phase-modulates the phase signal outputted from the PM variable fc filter to output a high-frequency phase-modulated signal. The power amplifier amplifies the high-frequency phase-modulated signal by using the voltage supplied from the amplifier, and outputs a resultant signal as a transmission signal. The AM variable fc filter and the PM variable fc filter respectively control the AM cutoff frequency and the PM cutoff frequency such that the AM cutoff frequency and the PM cutoff frequency each have an opposite characteristic to that of an output power of the transmission signal.

10 Claims, 17 Drawing Sheets

FIG. 3A

| Pout | AM_fc |
|------|-------|
| P1   | a1    |
| P2   | a2    |
| P3   | a3    |
| :    |       |
| Pn   | an    |

FIG. 3B

| Pout | PM_fc |
|------|-------|
| P1   | b1    |
| P2   | b2    |
| P3   | b3    |
| :    |       |
| Pn   | bn    |

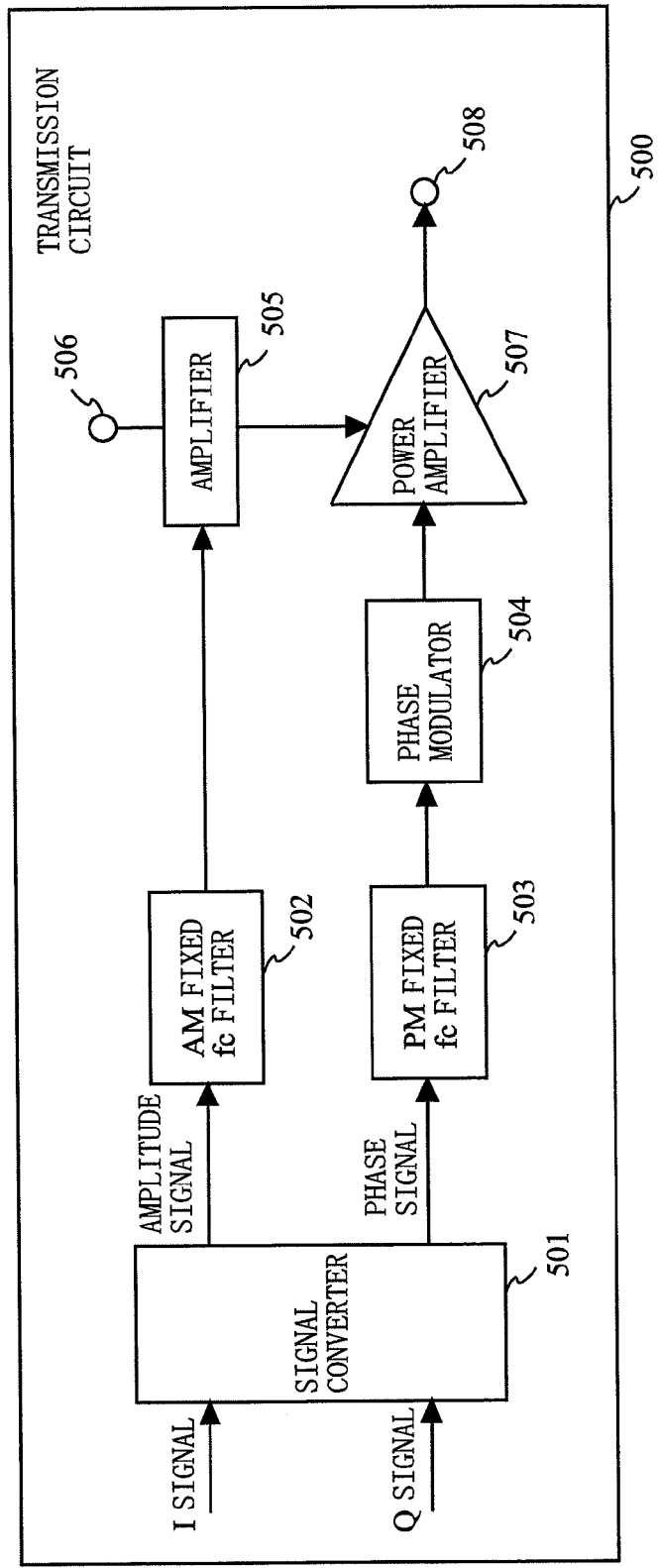
F I G. 1 1 PRIOR ART

F I G. 1 2 C  PRIOR ART
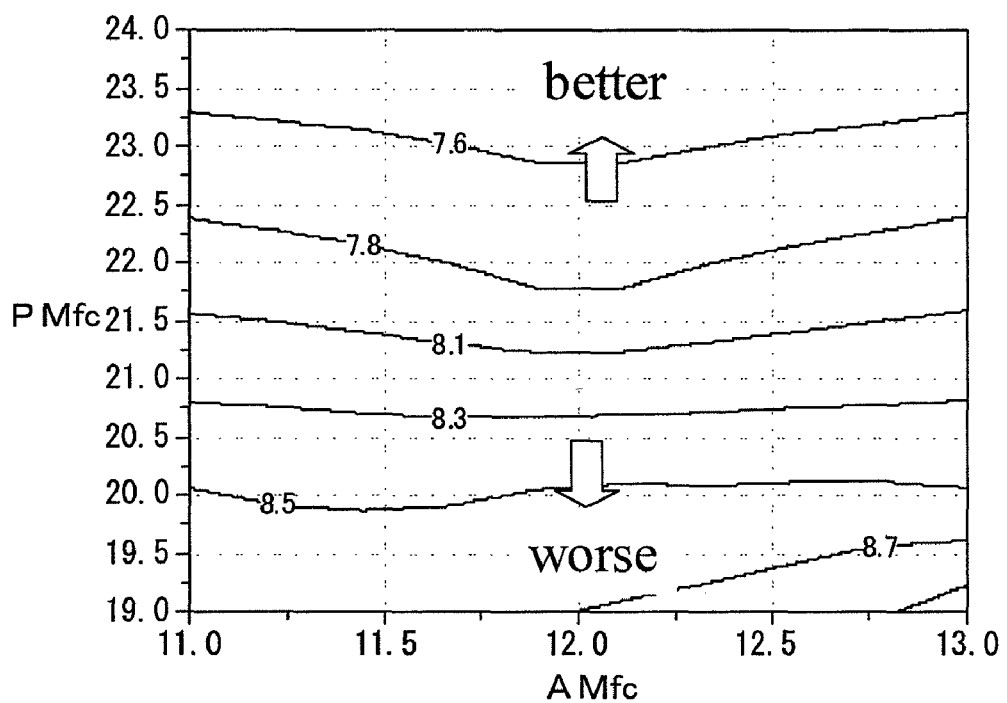

TRANSMISSION CIRCUIT AND COMMUNICATION DEVICE

BACKGROUND OF THE INVENTION

1. Field of the Invention

The present invention relates to a transmission circuit used in communication devices such as mobile phones and wireless LAN devices. The present invention particularly relates to a transmission circuit capable of operating with high linearity and high efficiency, and to a communication device using the transmission circuit.

2. Description of the Background Art

Communication devices such as mobile phones and wireless LAN devices are required to secure precision of an output signal and operate with low power consumption. Used in such communication devices is a transmission circuit for outputting a highly linear transmission signal, which operates with high efficiency. Hereinafter, a conventional transmission circuit will be described.

One of the conventional transmission circuits is, for example, a transmission circuit which uses a modulation method such as a quadrature modulation method to generate a transmission signal (herein after, referred to as a quadrature modulation circuit). Since the quadrature modulation circuit is well known, a description thereof will be omitted. A conventional transmission circuit, which is smaller in size and operates more efficiently than the quadrature modulation circuit, is a transmission circuit shown in Non-Patent Document 1, for example. FIG. 11 is a block diagram showing an exemplary structure of a conventional transmission circuit 500 disclosed in Non-Patent Document 1. In FIG. 11, the conventional transmission circuit 500 comprises a signal converter 501, an AM fixed fc filter 502, a PM fixed fc filter 503, a phase modulator 504, an amplifier 505, a power supply terminal 506, a power amplifier 507 and an output terminal 508.

I and Q signals are inputted to the signal converter 501. The signal converter 501 converts the I and Q signals into an amplitude signal and a phase signal, respectively, and outputs these signals. The amplitude signal is inputted to the AM fixed fc filter 502. The AM fixed fc filter 502 removes a high-frequency component from the amplitude signal, by using a fixed cutoff frequency (AM_fc). The amplitude signal outputted from the AM fixed fc filter 502 s inputted to the amplifier 505. The amplifier 505 supplies the power amplifier 507 with a voltage which is proportional to the inputted amplitude signal. This improves current-driven capability of the power amplifier 507. Note that, the amplifier 505 is supplied with a DC voltage from the power supply terminal 506.

The phase signal is inputted to the PM fixed fc filter 503. The PM fixed fc filter 503 uses a fixed cutoff frequency (PM_fc) to remove a high-frequency component from the phase signal. The phase signal outputted from the PM fixed fc filter 503 is inputted to the phase modulator 504. The phase modulator 504 phase-modulates the phase signal to output a high-frequency phase-modulated signal. The high-frequency phase-modulated signal is inputted to the power amplifier 507. The power amplifier 507 amplifies the high-frequency phase-modulated signal by using the voltage supplied from the amplifier 505, and outputs a resultant signal as an amplified signal. This amplified signal is outputted from the output terminal 508 as a transmission signal. The transmission circuit 500 as described above is referred to as a polar modulation circuit.

Here, based on the cutoff frequencies of the AM fixed fc filter 502 and the PM fixed fc filter 503, there are trade-off relationships among noise, distortion (ACLR) and EVM of the transmission signal. Provided below is an exemplary case where a UTMS modulation signal stipulated by 3GPP (3rd Generation Partnership Project: 3rd generation (3G) mobile unit communication system) standards is transmitted. FIG. 12A shows a reception band noise at a frequency which is 45 MHz away from a frequency of a transmission carrier signal contained in the transmission signal outputted from the conventional transmission circuit 500. FIG. 12B shows the distortion of the transmission signal (i.e., ACLR at a frequency 10 MHz away) outputted from the conventional transmission circuit 500. FIG. 12C shows the EVM of the transmission signal outputted from the conventional transmission circuit 500. In FIGS. 12A to 12C, the horizontal axis represents the cutoff frequency (AM_fc) of the AM fixed fc filter 502 which removes a high-frequency component from the amplitude signal, and the longitudinal axis represents the cutoff frequency (PM_fc) of the PM fixed fc filter 503 which removes a high-frequency component from the phase signal.

As shown in FIG. 12A, the noise of the transmission signal is decreased in accordance with a decrease in the cutoff frequency (AM_fc) of the AM fixed fc filter 502 and in the cutoff frequency (PM_fc) of the PM fixed fc filter 503. Also, as shown in FIG. 12B, the distortion (ACLR) of the transmission signal is improved in accordance with an increase in the cutoff frequency (AM_fc) of the AM fixed fc filter 502 and in the cutoff frequency (PM_fc) of the PM fixed fc filter 503. Further, as shown in FIG. 12C, the EVM of the transmission signal is improved in accordance with an increase in the cutoff frequency (PM_fc) of the PM fixed fc filter 503.

In the conventional transmission circuit 500, the cutoff frequency (AM_fc) of the AM fixed fc filter 502 and the cutoff frequency (PM_fc) of the PM fixed fc filter 503 are predetermined in consideration of a balance among the noise, distortion (ACLR) and EVM of the transmission signal such that an optimal transmission signal is outputted.

Non-Patent Document 1: F. H. Raab et al., "High-Efficiency L-Band Kahn-Technique Transmitter", 1998, IEEE MTT-S Int. Microwave Symp. Dig.

However, the conventional transmission circuit 500 has a problem that since the cutoff frequency (AM_fc) of the AM fixed fc filter 502 and the cutoff frequency (PM_fc) of the PM fixed fc filter 503 are fixed, the balance among the noise, ACLR and EVM of the transmission signal is disrupted when, e.g., an output power of the transmission signal changes. For this reason, the conventional transmission circuit 500 does not always output a highly-linear low-noise transmission signal.

SUMMARY OF THE INVENTION

Therefore, an object of the present invention is to provide a transmission circuit which is capable of operating with high linearity and with low noise even when the output power of the transmission signal changes.

The present invention is directed to a transmission circuit. In order to achieve the above object, the transmission circuit according to the present invention comprises: a signal converting section for converting input signals into an amplitude signal and a phase signal, respectively, and outputting the amplitude signal and the phase signal; an AM variable fc filter for removing a high frequency component from the amplitude signal by using an AM cutoff frequency; an amplifier for outputting an amplitude component signal which is obtained by amplifying the amplitude signal outputted from the AM variable fc filter; a PM variable fc filter for removing a high frequency component from the phase signal by using a PM cutoff frequency; a phase modulator for phase-modulating the phase signal outputted from the PM variable fc filter so as to output a high-frequency phase-modulated signal; a power amplifier for amplifying the high-frequency phase-modulated signal by using the amplitude component signal outputted from the amplifier, and outputting a resultant signal as a transmission signal; an AMfc adjusting circuit for adjusting the AM cutoff frequency of the AM variable fc filter; and a PMfc adjusting circuit for adjusting the PM cutoff frequency of the PM variable fc filter. The AMfc adjusting circuit lowers the AM cutoff frequency when a power level signal is great, and increases the AM cutoff frequency when the power level signal is small, thereby adjusting the AM cutoff frequency of the AM variable fc filter. The PMfc adjusting circuit lowers the PM cutoff frequency when the power level signal is great, and increases the PM cutoff frequency when the power level signal is small, thereby adjusting the PM cutoff frequency of the PM variable fc filter.

Preferably, the transmission circuit further comprises: a lookup table for prestoring optimal AM cutoff frequencies to be set for the AM variable fc filter, the optimal AM cutoff frequencies respectively corresponding to power level signals, and for prestoring optimal PM cutoff frequencies to be set for the PM variable fc filter, the optimal PM cutoff frequencies respectively corresponding to the power level signals. In this case, the AM variable fc filter reads an optimal AM cutoff frequency from the lookup table in accordance with the power level signal, and the PM variable fc filter reads an optimal PM cutoff frequency from the lookup table in accordance with the power level signal.

Preferably, the transmission circuit further comprises: an AM reference signal source for generating a reference signal in accordance with the AM cutoff frequency read from the lookup table; and a PM reference signal source for generating a reference signal in accordance with the PM cutoff frequency read from the lookup table. In this case, the AMfc adjusting circuit adjusts the AM cutoff frequency of the AM variable fc filter so as to be the same as a frequency of the reference signal generated by the AM reference signal source, and the PMfc adjusting circuit adjusts the PM cutoff frequency of the PM variable fc filter so as to be the same as a frequency of the reference signal generated by the PM reference signal source.

The AMfc adjusting circuit comprises: a referential variable fc filter for removing, using a particular cutoff frequency, a high frequency component from the reference signal generated by the AM reference signal source; a phase comparator for comparing phases of the reference signal generated by the AM reference signal source and an output signal of the referential variable fc filter, and outputting a comparison result as a control signal for controlling the particular cutoff frequency of the referential variable fc filter; and an LPF for outputting the control signal from the phase comparator to the referential variable fc filter. Here, the AM variable fc filter and the referential variable fc filter are provided on the same chip. The AMfc adjusting circuit uses the control signal outputted from the LPF, thereby controlling the AM cutoff frequency of the AM variable fc filter.

The PMfc adjusting circuit comprises: a referential variable fc filter for removing, using a particular cutoff frequency, a high frequency component from the reference signal generated by the PM reference signal source; a phase comparator for comparing phases of the reference signal generated by the PM reference signal source and an output signal of the referential variable fc filter, and outputting a comparison result as a control signal for controlling the particular cutoff frequency of the referential variable fc filter; and an LPF for outputting the control signal from the phase comparator to the referential variable fc filter. Here, the PM variable fc filter and the referential variable fc filter are provided on the same chip. The PMfc adjusting circuit uses the control signal outputted from the LPF, thereby controlling the PM cutoff frequency of the PM variable fc filter.

When the power level signal is smaller than a predetermined threshold value, the transmission circuit may not cause the AMfc adjusting circuit, the PMfc adjusting circuit, the AM reference signal source and the PM reference signal source to operate.

The transmission circuit may further comprise an AM delay adjusting circuit for adjusting a delay time of the amplitude signal. Also, the transmission circuit may further comprise a PM delay adjusting circuit for adjusting a delay time of the phase signal.

The present invention is also directed to a communication device comprising the above-described transmission circuit. The communication device comprises: the transmission circuit for generating a transmission signal; and an antenna for outputting the transmission signal generated by the transmission circuit. The communication device may further comprise: a reception circuit for processing a reception signal received from the antenna; and an antenna duplexer for outputting the transmission signal generated by the transmission circuit to the antenna, and outputting the reception signal received from the antenna to the reception circuit.

As described above, according to the present invention, when an output power of the transmission signal (i.e., the power level signal) is small, noise is reduced and an ACLR is deteriorated. Therefore, it is prioritized to improve the ACLR by increasing the cutoff frequency (AM_fc) of the AM variable fc filter and the cutoff frequency (PM_fc) of the PM variable fc filter, rather than to reduce the noise. On the other hand, when the output power of the transmission signal (i.e., the power level signal) of the transmission circuit is great, the noise is increased and the ACLR is improved, and therefore, it is prioritized to reduce the noise by lowering the cutoff frequency (AM_fc) of the AM variable fc filter and the cutoff frequency (PM_fc) of the PM variable fc filter, rather than to improve the ACLR. This allows the transmission circuit to operate with high linearity and low noise even when the output power of the transmission signal changes.

Further, by using the above-described transmission circuit, the communication device of the present invention is able to operate with low distortion and low noise over a wide output power range.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A shows an exemplary structure of a LUT_AM 109;

FIG. 3B shows an exemplary structure of a LUT_PM 110;

FIG. 4A is a block diagram showing an exemplary structure of a series regulator 105a;

FIG. 5A is a block diagram showing an exemplary structure of a power amplifier 107a;

FIG. 11 is a block diagram showing an exemplary structure of a conventional transmission circuit 500;

FIG. 12C shows an EVM of the transmission signal outputted from the conventional transmission circuit 500.

DETAILED DESCRIPTION OF THE PREFERRED EMBODIMENTS

First Embodiment

Figure 1:
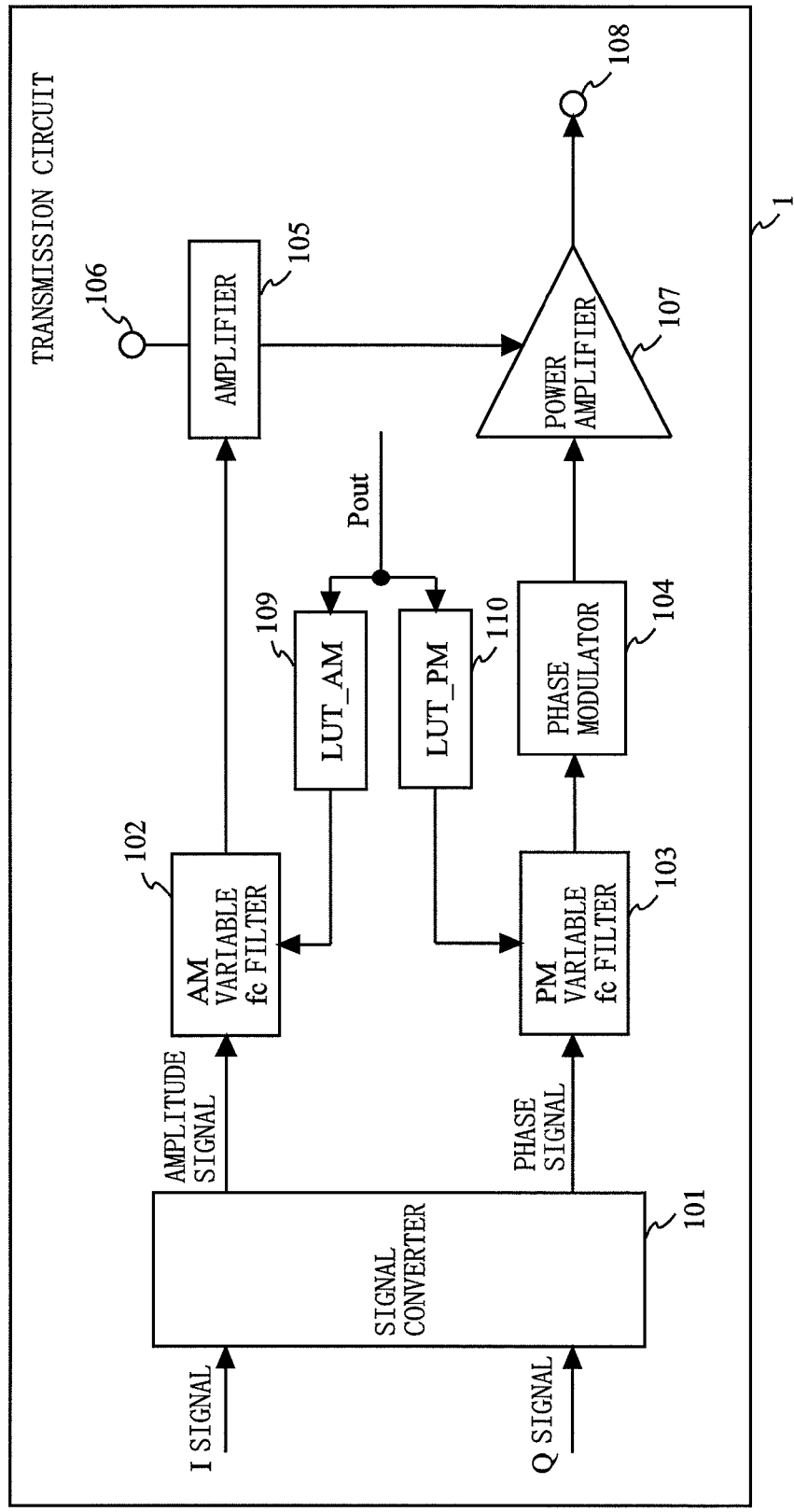
FIG. 1 is a block diagram showing an exemplary structure of a transmission circuit 1 according to a first embodiment of the present invention.

FIG. 1 is a block diagram showing an exemplary structure of a transmission circuit 1 according to a first embodiment of the present invention. In FIG. 1, the transmission circuit 1 comprises a signal converter 101, an AM variable fc filter 102, a PM variable fc filter 103, a phase modulator 104, an amplifier 105, a power supply terminal 106, a power amplifier 107, an output terminal 108, an AM lookup table (LUT_AM) 109 and a PM lookup table (LUT_PM) 110.

I and Q signals are inputted to the signal converter 101. The signal converter 101 converts the I and Q signals into an amplitude signal and a phase signal, respectively, and outputs these signals. The amplitude signal is inputted to the AM variable fc filter 102. Based on an output power Pout of a transmission signal (i.e., a power level signal), which is set by a baseband section (not shown), the AM variable fc filter 102 reads an optimal cutoff frequency (AM_fc) from the LUT_AM 109, and uses the read cutoff frequency to remove a high-frequency component from the amplitude signal. The amplitude signal outputted from the AM variable fc filter 102 is inputted to the amplifier 105. The amplifier 105 supplies the power amplifier 107 with an amplitude component signal which is proportional to the inputted amplitude signal. This consequently improves the current-driven capability of the power amplifier 107. The amplifier 105 is supplied with a DC voltage from the power supply terminal 106.

The phase signal is inputted to the PM variable fc filter 103. Based on the output power Pout of the transmission signal (i.e., the power level signal), which is set by the baseband section (not shown), the PM variable fc filter 103 reads an optimal cutoff frequency (PM_fc) from the $LUT_{13}$ PM 110, and uses the read cutoff frequency to remove a high-frequency component from the phase signal. The phase signal outputted from the PM variable fc filter 103 is inputted to the phase modulator 104. The phase modulator 104 phase-modulates the phase signal to output a high-frequency phase-modulated signal. The high-frequency phase-modulated signal is inputted to the power amplifier 107. The power amplifier 107 amplifies the high-frequency phase-modulated signal by using the amplitude component signal supplied from the amplifier 105, and outputs a resultant signal as an amplified signal. The amplified signal is outputted from the output terminal 108 as the transmission signal. Structures of the amplifier 105 and the power amplifier 107 will be described later.

Figure 2A:
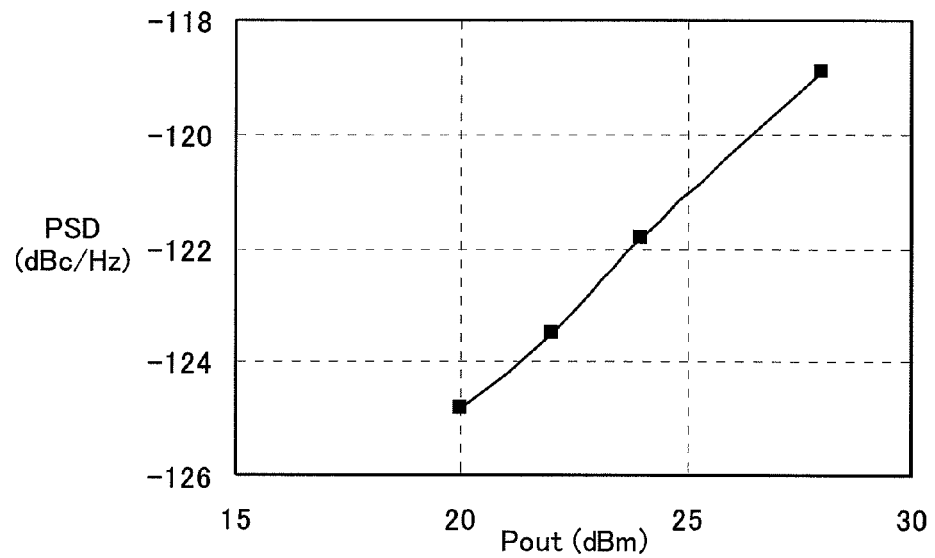
FIG. 2A shows a relationship between an output power Pout of a transmission signal outputted from the transmission circuit 1 and a noise.
Figure 2B:
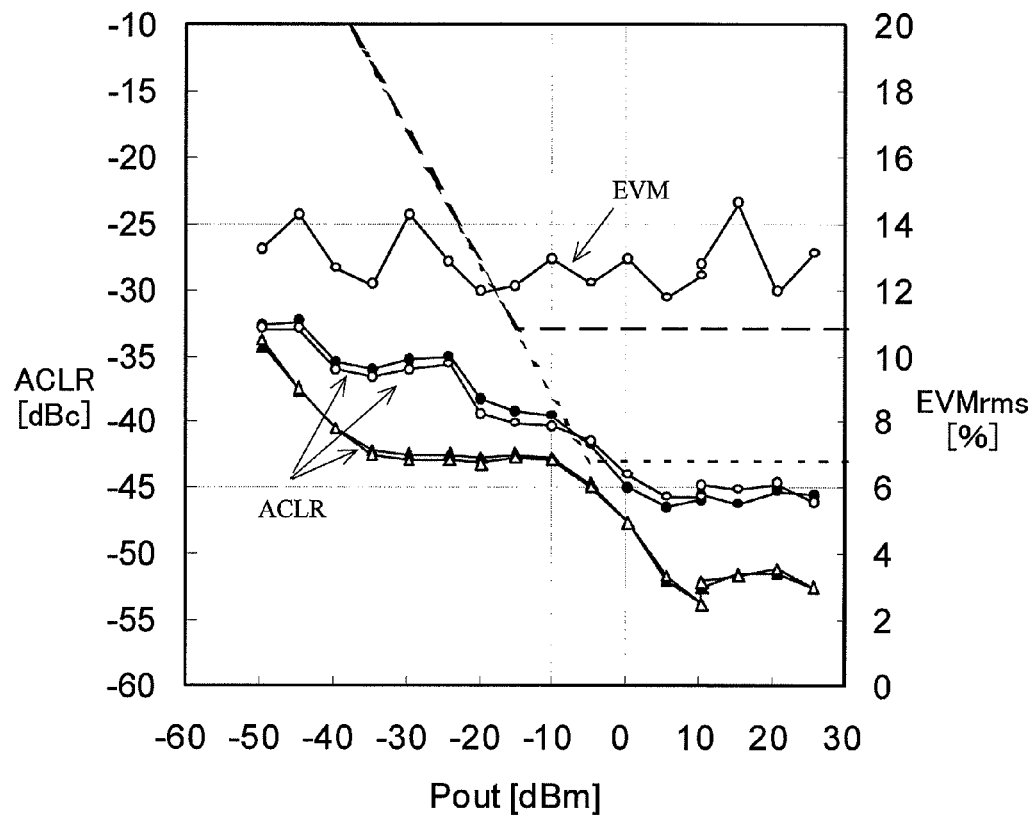
FIG. 2B shows a relationship between the output power Pout and an ACLR of the transmission signal, and shows a relationship between the output power Pout and an EVM of the transmission signal.

FIG. 2A shows, as one example, a relationship between the output power Pout of the transmission signal outputted by the transmission circuit 1 which transmits a UMTS modulation signal, and a reception band noise at a frequency which is 45 MHz away from a transmission carrier signal. FIG. 2B shows a relationship between the output power Pout and an ACLR of the transmission signal, and shows a relationship between the output power Pout and an EVM of the transmission signal. Here, these relationships are realized on condition that the cutoff frequencies set for the AM variable fc filter 102 and the PM variable fc filter 103 are constant. As shown in FIG. 2A, the greater the output power Pout of the transmission signal, the greater the noise of the transmission signal. On the other hand, as shown in FIG. 2B, the greater the output power Pout of the transmission signal, the more improved the ACLR of the transmission signal.

Accordingly, when the output power Pout of the transmission signal (i.e., the power level signal) is small in the transmission circuit 1, the noise is reduced and the ACLR is deteriorated, and therefore, it is prioritized to improve the ACLR by increasing the cutoff frequency (AM_fc) of the AM variable fc filter 102 and the cutoff frequency (PM_fc) of the PM variable fc filter 103, rather than to reduce the noise. On the other hand, when the output power Pout of the transmission signal (i.e., the power level signal) is great in the transmission circuit 1, the noise is increased and the ACLR is improved, and therefore, it is prioritized to reduce the noise by lowering the cutoff frequency (AM_fc) of the AM variable fc filter 102 and the cutoff frequency (PM_fc) of the PM variable fc filter 103, rather than to improve the ACLR.

Thus, the transmission circuit 1 is able to reduce the noise of the transmission signal and improve the ACLR, by controlling the cutoff frequency (AM_fc) of the AM variable fc filter 102 and the cutoff frequency (PM_fc) of the PM variable fc filter 103 such that the cutoff frequencies each have an opposite characteristic to that of the output power Pout of the transmission signal.

When the output power Pout of the transmission signal is small, it can also be expected in the transmission circuit 1 that the EVM of the transmission signal is improved by increasing the cutoff frequency (AM_fc) of the AM variable fc filter 102 and the cutoff frequency (PM_fc) of the PM variable fc filter 103.

FIG. 3A shows an exemplary structure of the LUT_AM 109. As shown in FIG. 3A, the LUT_AM 109 prestores optimal cutoff frequencies (AM_fc) to be set for the AM variable fc filter 102, the optimal cutoff frequencies respectively corresponding to output powers Pout of the transmission signal. Note that, in the example of FIG. 3A, there are relationships as follows: $P1 \leq P2 \leq P3 \leq \ldots \leq Pn$; and $a1 \geq a2 \geq a3 \geq \ldots \geq an$. FIG. 3B shows an exemplary structure of the LUT_PM 110. As shown in FIG. 3B, the LUT_PM 110 prestores optimal cutoff frequencies (PM_fc) to be set for the PM variable fc filter 103, the optimal cutoff frequencies respectively corresponding to the output powers Pout of the transmission signal. Note that, in the example of FIG. 3B, there are relationships as follows: $P1 \leq P2 \leq P3 \leq \ldots \leq Pn$; and $b1 \geq b2 \geq b3 \geq \ldots \geq bn$. Here, the LUT_AM 109 and the LUT_PM 110 may be collectively considered as a single lookup table (LUT).

The transmission circuit 1 may not necessarily comprise the LUT_AM 109 and the LUT_PM 110. To be specific, instead of having the LUT_AM 109 and the LUT_PM 110, the transmission circuit 1 may be structured so as to be able to determine, by calculation, an optimal cutoff frequency (AM_fc) to be set for the AM variable fc filter 102 and an optimal cutoff frequency (PM_fc) to be set for the PM variable fc filter 103.

Further, the above AM variable fc filter 102 and the PM variable fc filter 103 may be either digital filters or analogue filters. The same effect can be obtained regardless of a filter type or an order of each filter.

Figure 4A:
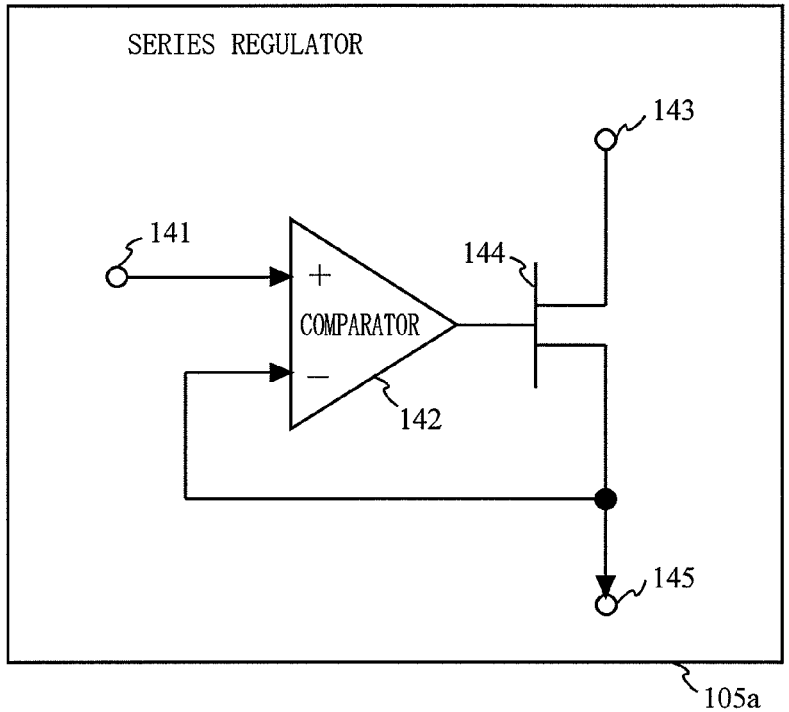

Next, a structure of the amplifier 105 will be described. For example, the amplifier 105 may be structured using a series regulator. FIG. 4A is a block diagram showing an exemplary structure of a series regulator 105a. In FIG. 4A, the series regulator 105a includes an input terminal 141, a comparator 142, a power supply terminal 143, a transistor 144 and an output terminal 145. Here, the transistor 144 is a field-effect transistor. The amplitude signal is inputted to the input terminal 141 via the AM variable fc filter 102. The amplitude signal is inputted to a gate terminal of the transistor 144 via the comparator 142. A drain terminal of the transistor 144 is supplied with the DC voltage from the power supply terminal 143.

The transistor 144 outputs, from a source terminal, a voltage proportional to a magnitude of the inputted amplitude signal. The voltage outputted from the source terminal of the transistor 144 is fed back to the comparator 142. The comparator 142 adjusts, based on the fed back voltage, the magnitude of the amplitude signal inputted to the gate terminal of the transistor 144. In this manner, the series regulator 105a is able to stably supply, from the output terminal 145, a voltage corresponding to the magnitude of the amplitude signal. Note that, the same effect can be obtained even if the transistor 144 is a bipolar transistor. By using the series regulator 105a for the amplifier 105, the transmission circuit 1 can operate over a wide band.

Figure 4B:
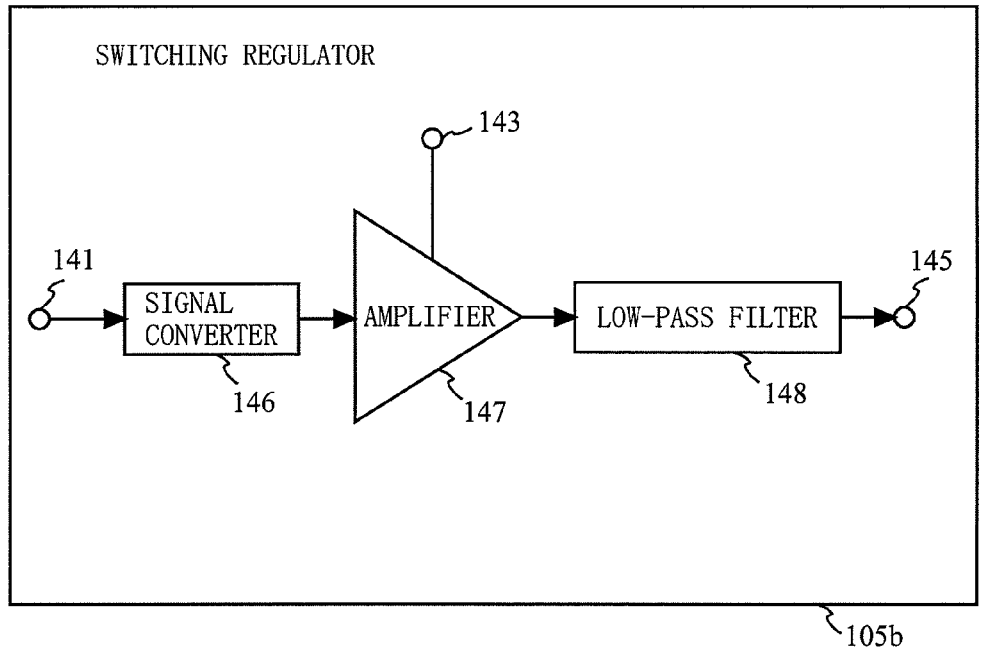
FIG. 4B is a block diagram showing an exemplary structure of a switching regulator 105b.

Further, the amplifier 105 may be structured using a switching regulator, for example. FIG. 4B is a block diagram showing an exemplary structure of a switching regulator 105b. In FIG. 4B, the switching regulator 105b includes the input terminal 141, the power supply terminal 143, a signal converter 146, an amplifier 147, a low-pass filter 148 and the output terminal 145. The amplitude signal is inputted to the input terminal 141 via the AM variable fc filter 102. The amplitude signal is inputted to the signal converter 146. The signal converter 146 converts the inputted amplitude signal into a pulse-width modulated signal or a delta-sigma modulated signal. The signal resulting from the conversion at the signal converter 146 is inputted to the amplifier 147. The amplifier 147 amplifies the inputted signal, and then outputs a resultant signal. Note that the amplifier 147 is supplied with the DC voltage from the power supply terminal 143. For the amplifier 147, a high-efficiency switching amplifier such as a D-class amplifier is used.

The signal outputted from the amplifier 147 is inputted to the low-pass filter 148. The low-pass filter 148 removes, from the signal outputted from the amplifier 147, spurious components such as quantization noise and switching noise. The signal, from which the spurious components have been removed by the low-pass filter 148, is outputted from the output terminal 145 as a voltage corresponding to the magnitude of the amplitude signal. Here, in order to stabilize the voltage to be outputted, the switching regulator 105b may feed back, to the signal converter 146, the signal outputted from the low-pass filter 148. The transmission circuit 1 is able to reduce power consumption thereof by using the switching regulator 105b, which operates with high efficiency, for the amplifier 105.

Figure 4C:
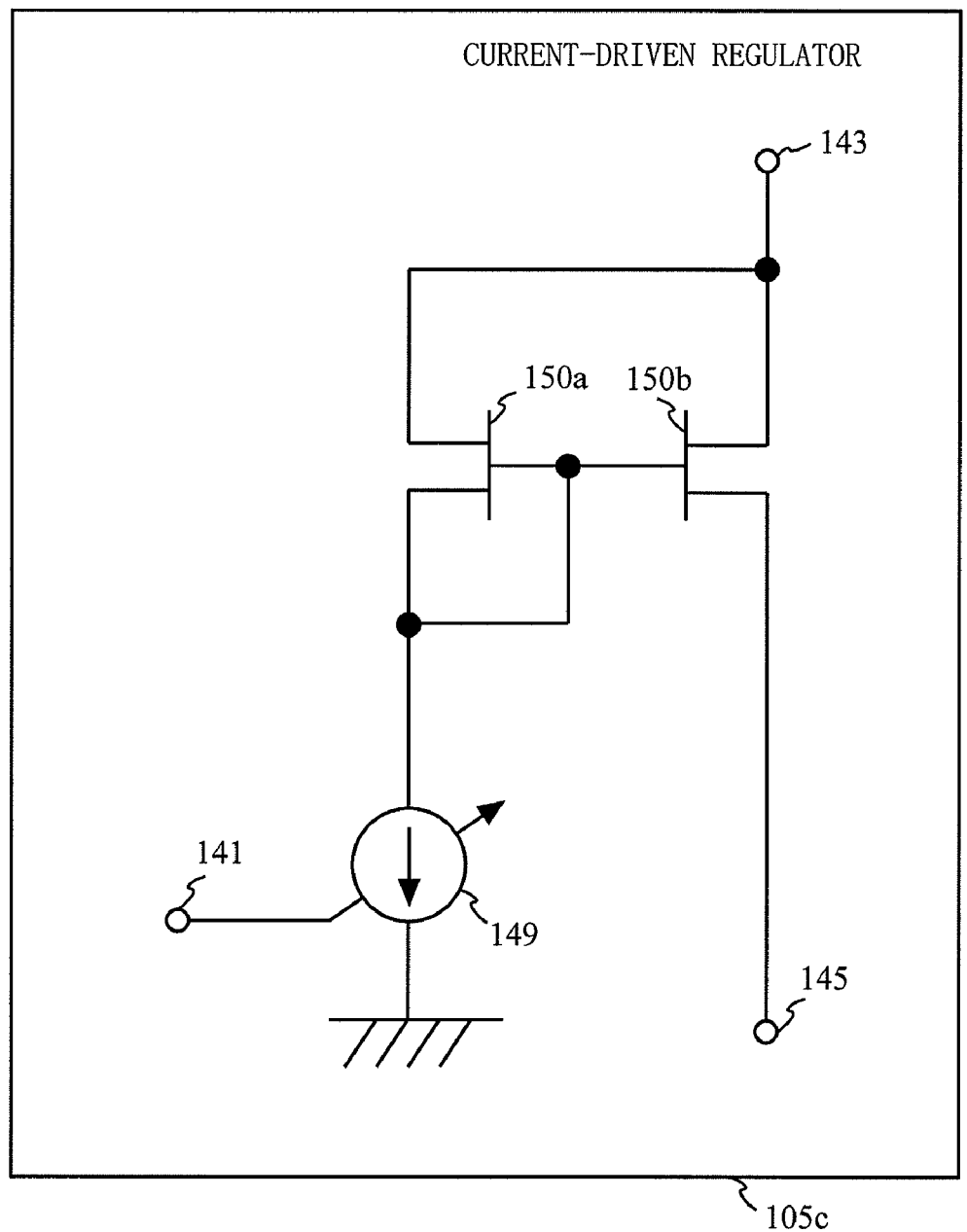
FIG. 4C is a block diagram showing an exemplary structure of a current-driven regulator 105c.

Still further, the amplifier 105 may be structured with a current-driven regulator, for example. FIG. 4C is a block diagram showing an exemplary structure of a current-driven regulator 105c. In FIG. 4C, the current-driven regulator 105c includes the input terminal 141, the power supply terminal 143, a variable-current source 149, a transistor 150a, a transistor 150b and the output terminal 145. The amplitude signal is inputted to the input terminal 141 via the AM variable fc filter 102. The power supply terminal 143 is supplied with the DC voltage. The amplitude signal inputted via the input terminal 141 is outputted from the output terminal 145 via the variable-current source 149, the transistor 150a and the transistor 150b as an electric current corresponding to the magnitude of the amplitude signal. Note that, the transistors 150a and 150b may be field-effect transistors or bipolar transistors.

Figure 5A:
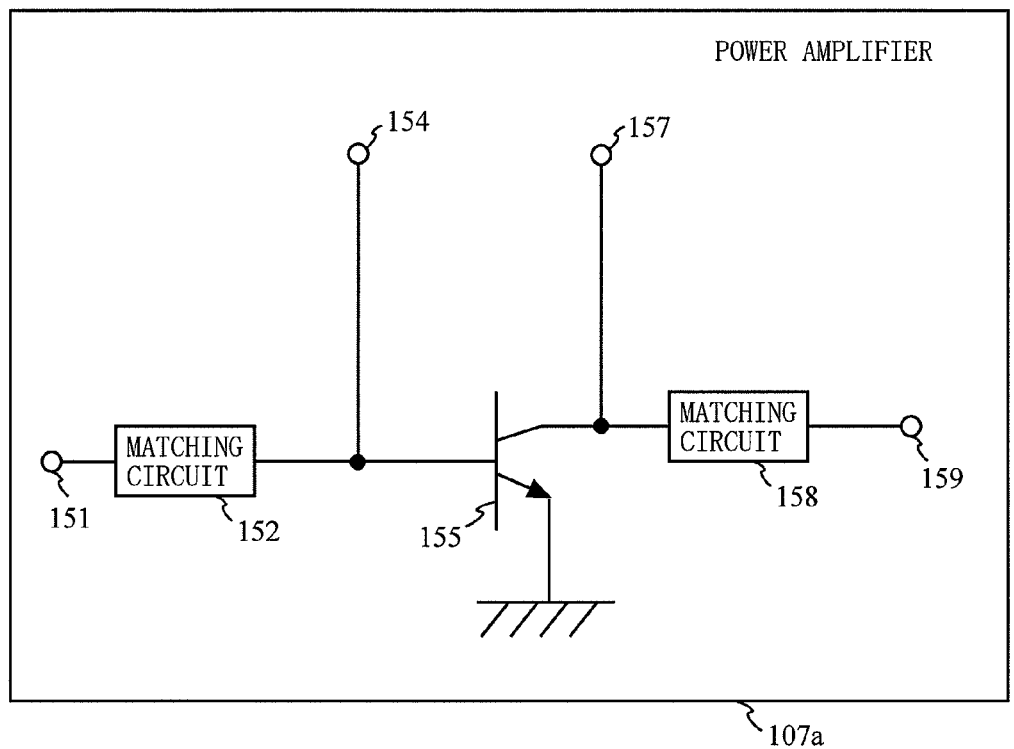

Next, a structure of the power amplifier 107 will be described. The power amplifier 107 may be structured as shown in FIG. 5A, for example. FIG. 5A is a block diagram showing an exemplary structure of a power amplifier 107a. In FIG. 5A, the power amplifier 107a includes an input terminal 151, a matching circuit 152, a power supply terminal 154, a transistor 155, an input terminal 157, a matching circuit 158 and an output terminal 159. Here, the transistor 155 is a bipolar transistor. The high-frequency phase-modulated signal is inputted to the input terminal 151 from the phase modulator 104. The high-frequency phase-modulated signal is inputted to a base terminal of the transistor 155 via the matching circuit 152.

Here, a DC voltage is applied to the power supply terminal 154. In other words, the base terminal of the transistor 155 is supplied with a voltage via the power supply terminal 154. In the case where the amplifier 105 is structured with the series regulator 105a or the switching regulator 105b, the input terminal 157 is supplied, from the amplifier 105, with the voltage corresponding to the magnitude of the amplitude signal. The voltage corresponding to the magnitude of the amplitude signal is supplied to a collector terminal of the transistor 155. The transistor 155 amplifies the high-frequency phase-modulated signal by using the voltage corresponding to the magnitude of the amplitude signal, and outputs a resultant signal as the amplified signal.

The amplified signal outputted from the transistor 155 is outputted from the output terminal 159 via the matching circuit 158. Note that, the same effect can be obtained even if the transistor 155 is a field-effect transistor. In the case where the amplifier 105 is structured with the current-driven regulator 105c, the electric current corresponding to the magnitude of the amplitude signal is inputted to the input terminal 157 from the current-driven regulator 105c. In this case, the electric current corresponding to the magnitude of the amplitude signal is inputted to the collector terminal of the transistor 155. The transistor 155 amplifies the high-frequency phase-modulated signal by using the electric current corresponding to the magnitude of the amplitude signal, and outputs a resultant signal as the amplified signal.

Figure 5B:
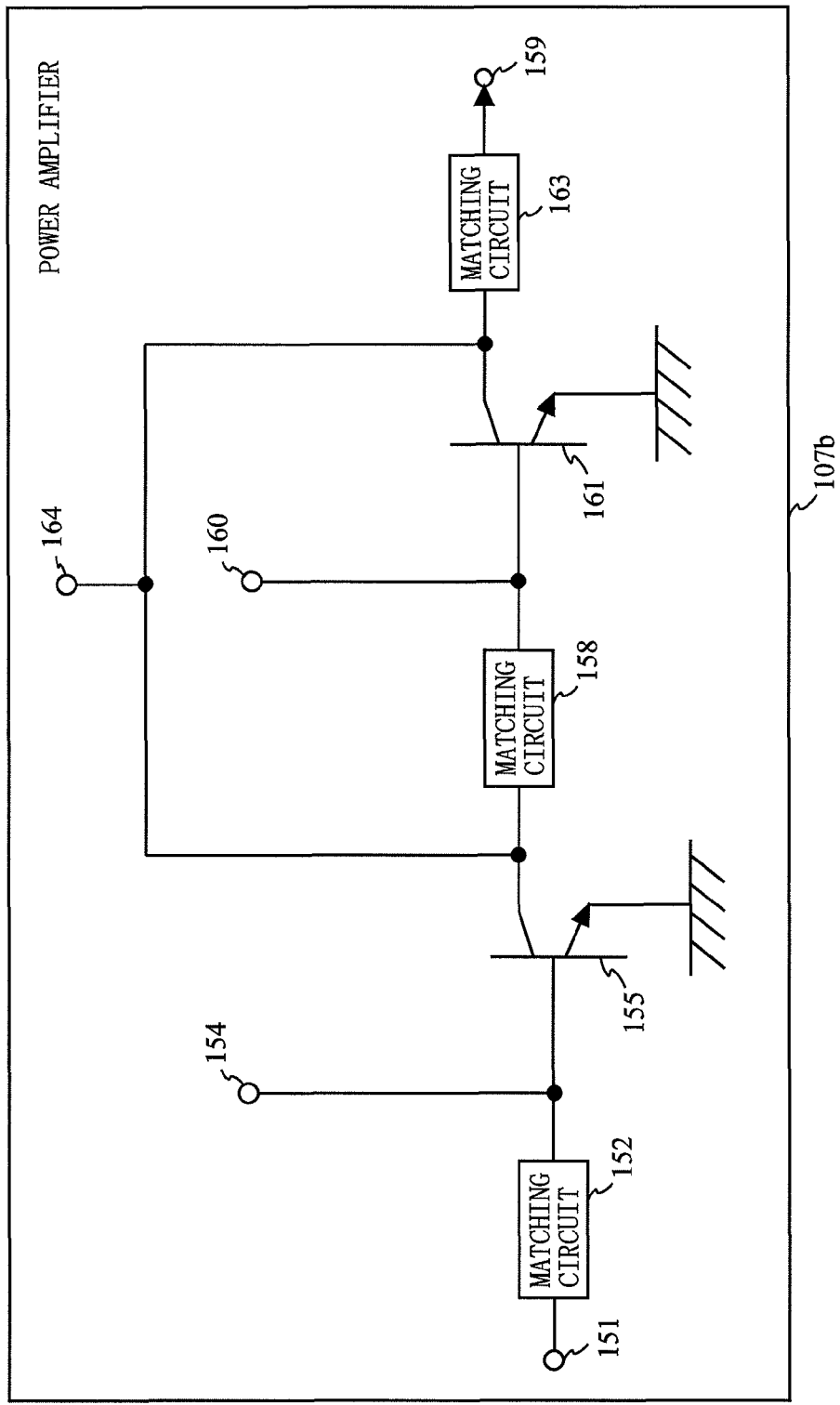
FIG. 5B is a block diagram showing an exemplary structure of a power amplifier 107b.

Further, the power amplifier 107 may be structured as shown in FIG. 5B, for example. FIG. 5B is a block diagram showing an exemplary structure of a power amplifier 107b. As shown in FIG. 5B, a fundamental structure of the power amplifier 107b is a result of serially connecting two power amplifiers 107a (see FIG. 5A). The base terminal of the transistor 155 is supplied with the voltage from the power supply terminal 154. A base terminal of a transistor 161 is supplied with a voltage from a power supply terminal 160.

The collector terminal of the transistor 155 is supplied, from the amplifier 105, with the voltage corresponding to the magnitude of the amplitude signal via a terminal 164. Also, a collector terminal of the transistor 161 is supplied, from the amplifier 105, with the voltage corresponding to the magnitude of the amplitude signal via the terminal 164. By having this structure, the power amplifier 107b is able to output an amplified signal which has a greater dynamic range than the amplified signal outputted by the power amplifier 107a shown in FIG. 5A. Note that, the transistors in the power amplifier 107b are bipolar transistors. However, the same effect can be obtained even if the transistors are field-effect transistors. Further, the voltages respectively supplied to the collector terminals of the transistors 155 and 161 may not necessarily be the same. For example, a voltage supplied to the collector terminal of one of the transistors may be a constant multiplication of a voltage supplied to the collector terminal of the other transistor. Also, the collector terminal of the transistor 155 may be supplied with a fixed voltage, and only the voltage supplied to the collector terminal of the transistor 161 may correspond to the magnitude of the amplitude signal.

As described above, according to the transmission circuit 1 of the first embodiment of the present invention, when the output power Pout of the transmission signal (i.e., the power level signal) is small, the noise is reduced and the ACLR is deteriorated, and therefore, it is prioritized to improve the ACLR by increasing the cutoff frequency (AM_fc) of the AM variable fc filter 102 and the cutoff frequency (PM_fc) of the PM variable fc filter 103, rather than to reduce the noise. On the other hand, when the output power Pout of the transmission signal (i.e., the power level signal) of the transmission circuit 1 is great, the noise is increased and the ACLR is improved, and therefore, it is prioritized to reduce the noise by lowering the cutoff frequency (AM_fc) of the AM variable fc filter 102 and the cutoff frequency (PM_fc) of the PM variable fc filter 103, rather than to improve the ACLR. This allows the transmission circuit 1 to operate while maintaining, even when the output power of the transmission signal changes, sufficiently high linearity and low noise at each output power.

FIG. 1 shows a structure in which the LUT is referred to based on the output power (i.e., the power level signal) which is set by the baseband section. However, the structure may be such that the LUT is referred to based on the output power measured at the output terminal 108. Further, the above description gives an example with respect to the UMTS modulation signal. However, the effect of the present invention is not limited to the case of the UMTS modulation signal. The same effect can be obtained even in the case of other arbitrary modulation signals or modulation methods. Still further, the cutoff frequencies (fc) of the AM variable fc filter 102 and the PM variable fc filter 103 are not necessarily changed at the same time. Only either one of the cutoff frequencies (fc) of the AM variable fc filter 102 and the PM variable fc filter 103 may be variable.

Second Embodiment

Figure 6:
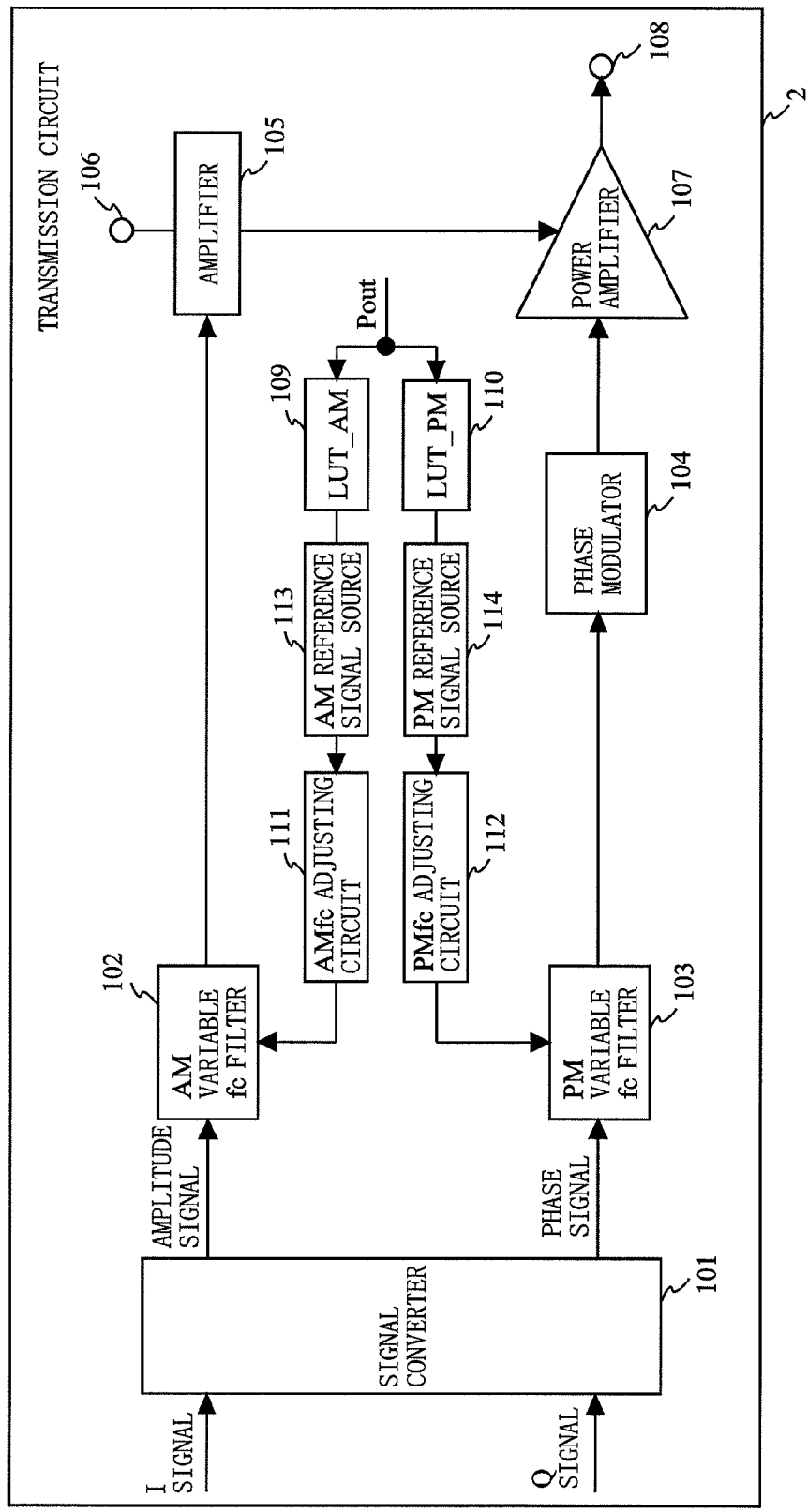
FIG. 6 shows an exemplary structure of a transmission circuit 2 according to a second embodiment of the present invention.

FIG. 6 shows an exemplary structure of a transmission circuit 2 according to a second embodiment of the present invention. In FIG. 6, the transmission circuit 2 further comprises an AMfc adjusting circuit 111, a PMfc adjusting circuit 112, an AM reference signal source 113 and a PM reference signal source 114, as compared to the transmission circuit 1 according to the first embodiment. The AMfc adjusting circuit 111 adjusts the cutoff frequency of the AM variable fc filter 102 so as to reduce variation in characteristics of the AM variable fc filter 102 which is caused by an individual difference, temperature change or the like thereof. The PMfc adjusting circuit 112 adjusts the cutoff frequency of the PM variable fc filter 103 so as to reduce variation in characteristics of the PM variable fc filter 103 which is caused by an individual difference, temperature change or the like thereof.

The AM reference signal source 113 generates a reference signal in accordance with the cutoff frequency (AM_fc) outputted from the LUT_AM 109. The PM reference signal source 114 generates a reference signal in accordance with the cutoff frequency (PM_fc) outputted from the LUT_PM 110. The AM reference signal source 113 and the PM reference signal source 114 are each structured with a TCXO (temperature-compensated crystal oscillator) or the like, and each output a rectangular signal, which has great frequency stability, as a reference signal.

Figure 7:
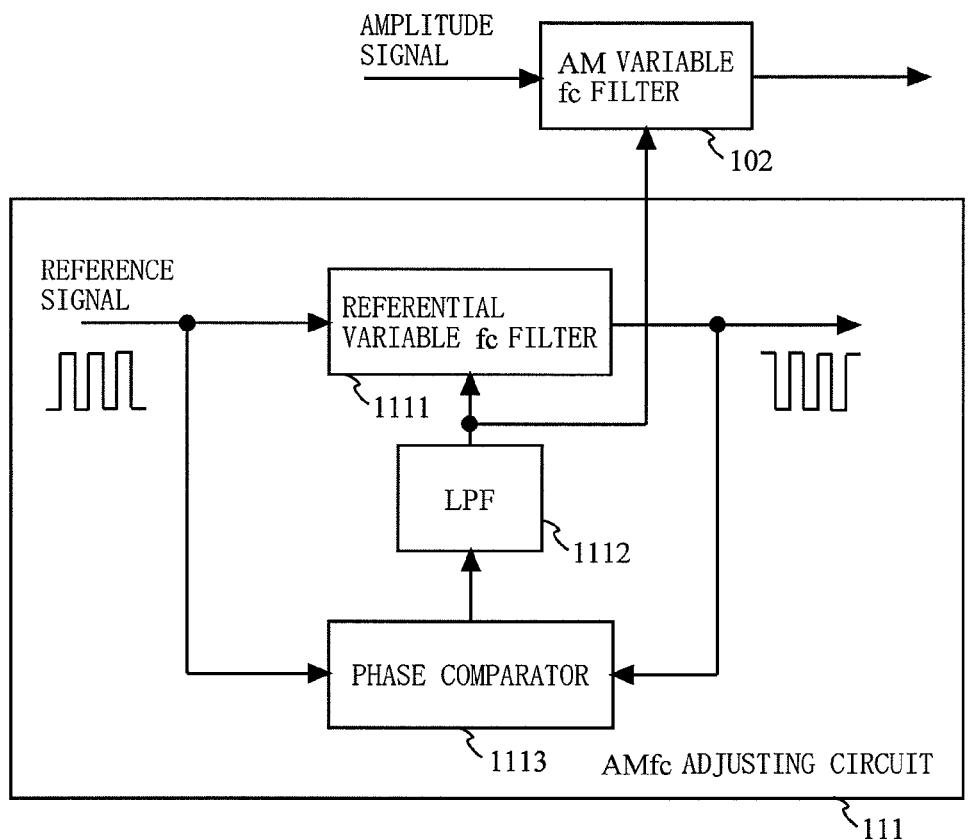
FIG. 7 is a block diagram showing an exemplary structure of an AMfc adjusting circuit 111.

FIG. 7 is a block diagram showing an exemplary structure of the AMfc adjusting circuit 111. In FIG. 7, the AMfc adjusting circuit 111 comprises a referential variable fc filter 1111, an LPF 1112 and a phase comparator 1113. The reference signal generated by the AM reference signal source 113 is inputted to the referential variable fc filter 1111 and the phase comparator 1113. The referential variable fc filter 1111 operates as an LPF which has a cutoff frequency determined by a control signal from the LPF 1112. An output signal of the referential variable fc filter 1111 is inputted to the phase comparator 1113.

The phase comparator 1113 compares phases of the reference signal and the output signal of the referential variable fc filter 1111, and outputs a result of the comparison as a control signal for controlling the cutoff frequency of the referential variable fc filter 1111. The phase comparator 1113 is typically an executive OR (EXOR) type. A loop of the AMfc adjusting circuit 111 operates such that a phase difference between the reference signal and the output signal of the referential variable fc filter 1111 becomes 90 degrees. Since a frequency of the reference signal, at which the phase difference between the reference signal and the output signal of the referential variable fc filter 1111 becomes 90 degrees, is to be the cutoff frequency of the referential variable fc filter 1111, the AMfc adjusting circuit 111 adjusts the cutoff frequency of the referential variable fc filter 1111 so as to be the same as the frequency of the reference signal.

The control signal outputted from the phase comparator 1113 is inputted to the referential variable fc filter 1111 via the LPF 1112. For the referential variable fc filter 1111, a gm-C filter is used, for example. The gm-C filter has the same attenuation characteristic as that of a second-order LC low-pass filter, and is capable of controlling the cutoff frequency by changing gm in accordance with the control signal.

The AM variable fc filter 102 has equivalent characteristics to those of the referential variable fc filter 1111. Preferably, the AM variable fc filter 102 and the referential variable fc filter 1111 are provided physically adjacent to each other (e.g., on the same chip). Since the AM variable fc filter 102 and the referential variable fc filter 1111 are provided physically adjacent to each other, the characteristics of the referential variable fc filter 1111 closely follow the characteristics of the AM variable fc filter 102 with respect to, e.g., an influence from impurity concentration distribution in a semiconductor or an influence from a change in temperature. Here, a gm-C filter having a high pair quality with the referential variable fc filter 1111 (i.e., variation in elements between the two is small) is used for the AM variable fc filter 102, for example.

By using the control signal generated by the AMfc adjusting circuit 111 as a control signal for controlling the cutoff frequency of the AM variable fc filter 102, the transmission circuit 2 is able to precisely adjust the cutoff frequency of the AM variable fc filter 102 to the frequency of the reference signal. Note that, instead of having the structure as shown in FIG. 7, the AMfc adjusting circuit 111 may be structured so as to refer to a LUT and thereby adjust the cutoff frequency of the AM variable fc filter 102, such that variation in characteristics of the AM variable fc filter 102, which is caused by an individual difference, temperature change or the like thereof, is reduced. In this case, the LUT has values preset therein which are used to adjust the cutoff frequency of the AM variable fc filter 102. Since the PMfc adjusting circuit 112 is the same as the AMfc adjusting circuit 111, a description thereof will be omitted.

As described above, according to the transmission circuit 2 of the second embodiment of the present invention, variation in characteristics of each of the AM variable fc filter 102 and the PM variable fc filter 103, which is caused by an individual difference, temperature change or the like thereof, can be reduced. This allows the transmission circuit 2 to operate with high linearity and with low noise even if variation in characteristics of the AM variable fc filter 102 and the PM variable fc filter 103 occurs.

Figure 8:
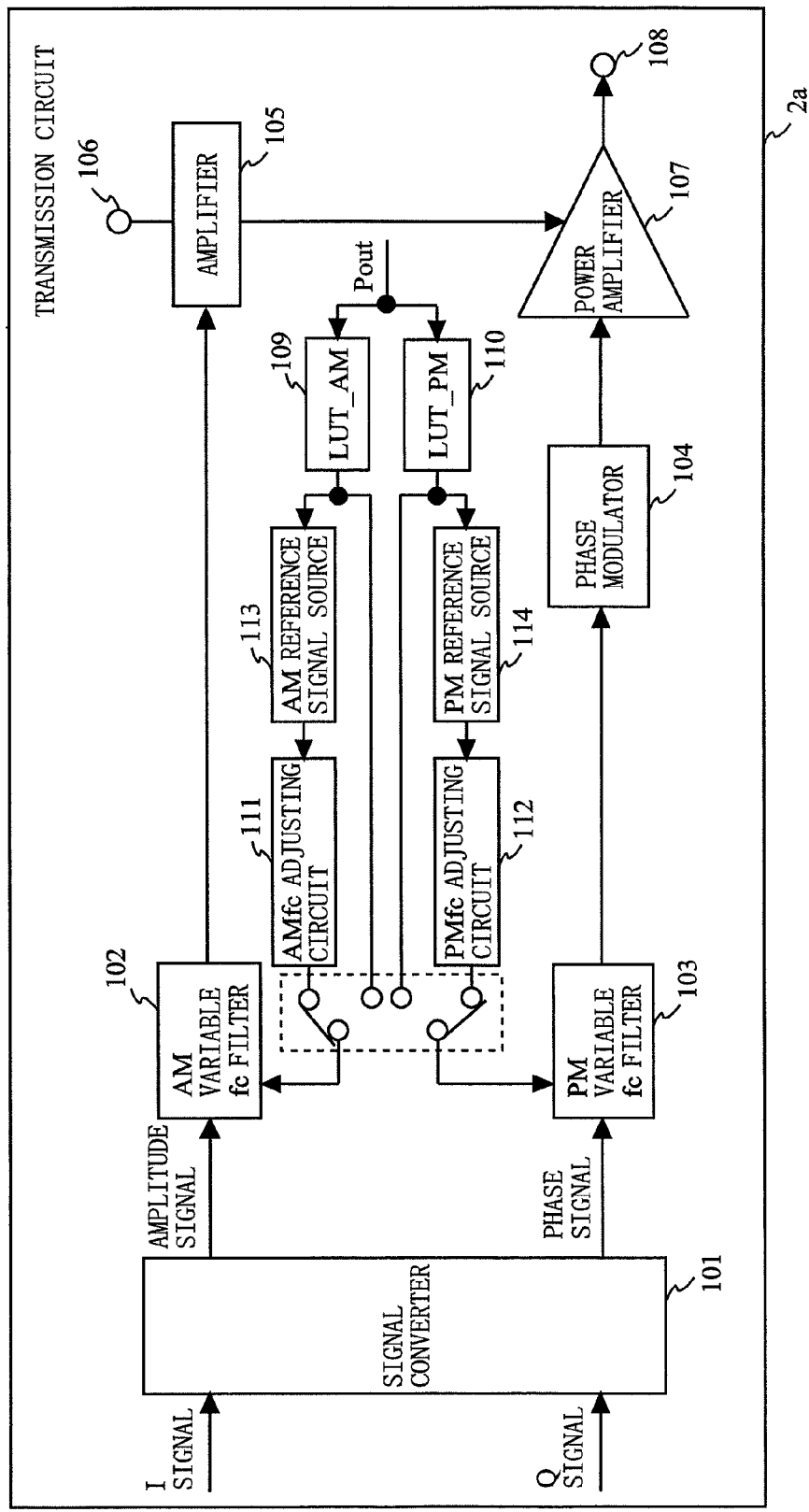
FIG. 8 is a block diagram showing an exemplary structure of a transmission circuit 2a according to the second embodiment of the present invention.

The transmission circuit 2 may have a similar structure to that of a transmission circuit 2a as shown in FIG. 8 in which whether or not to cause the AMfc adjusting circuit 111, the PMfc adjusting circuit 112, the AM reference signal source 113 and the PM reference signal source 114 to operate is switched based on the output power Pout of the transmission signal (i.e., the power level signal). FIG. 8 is a block diagram showing an exemplary structure of the transmission circuit 2a according to the second embodiment of the present invention. In FIG. 8, when the output power Pout of the transmission signal (i.e., the power level signal) of the transmission circuit 2a is small, the AMfc adjusting circuit 111, the PMfc adjusting circuit 112, the AM reference signal source 113 and the PM reference signal source 114 are not caused to operate, because the amount of power to be consumed when these components operate accounts for a nonnegligible proportion of the entire power consumption. To be specific, when the output power Pout of the transmission signal (i.e., the power level signal) is smaller than a predetermined threshold value, the transmission circuit 2a switches a switch so as to connect the AM variable fc filter 102 to the LUT_AM 109, and to connect the PM variable fc filter 103 to the LUT_PM 110.

In this case, however, it is preferred that the cutoff frequencies of the AM variable fc filter 102 and the PM variable fc filter 103 are each set at a value which has some positive margin from a typical value, so as to prevent distortion deterioration due to variation in characteristics, which variation is caused by an individual difference, temperature change or the like when the power is low.

On the other hand, when the output power Pout of the transmission signal (i.e., the power level signal) is great, the transmission circuit 2a causes the AMfc adjusting circuit 111, the PMfc adjusting circuit 112, the AM reference signal source 113 and the PM reference signal source 114 to operate. To be specific, when the output power Pout of the transmission signal (i.e., the power level signal) is equal to or greater than the predetermined threshold value, the transmission circuit 2a switches the switch so as to connect the AM variable fc filter 102 to the AMfc adjusting circuit 111, and connect the PM variable fc filter 103 to the PMfc adjusting circuit 112.

Thus, when the output power Pout of the transmission signal is small, the transmission circuit 2a is able to reduce power consumption by preventing the AMfc adjusting circuit 111, the PMfc adjusting circuit 112, the AM reference signal source 113 and the PM reference signal source 114 from operating.

FIGS. 6 and 8 each show a structure in which the LUT is referred to based on the output power set by the baseband section (i.e., the power level signal). However, the structure may be such that the LUT is referred to based on the output power measured at the output terminal 108. Further, the above description gives an example with respect to the UMTS modulation signal. However, the effect of the present invention is not limited to the case of the UMTS modulation signal. The same effect can be obtained even in the case of other arbitrary modulation signals or modulation methods. Still further, the cutoff frequencies (fc) of the AM variable fc filter 102 and the PM variable fc filter 103 are not necessarily changed at the same time. Only either one of the cutoff frequencies (fc) of the AM variable fc filter 102 and the PM variable fc filter 103 may be variable.

Third Embodiment

In the above-described transmission circuits 1 and 2 according to the first and second embodiments, the amplitude signal and the phase signal are separated, and the paths through which the amplitude signal and the phase signal are respectively inputted into the power amplifier 107 are different. For this reason, there is a possibility that a differential delay occurs between the amplitude signal and the phase signal. There is also a possibility that adjusting the cutoff frequencies of the AM variable fc filter 102 and the PM variable fc filter 103 causes the differential delay between the amplitude signal and the phase signal to vary. The differential delay between the amplitude signal and the phase signal causes distortion of the transmission signal. Therefore, a transmission circuit according to a third embodiment has a feature to eliminate the differential delay between the amplitude signal and the phase signal.

Figure 9A:
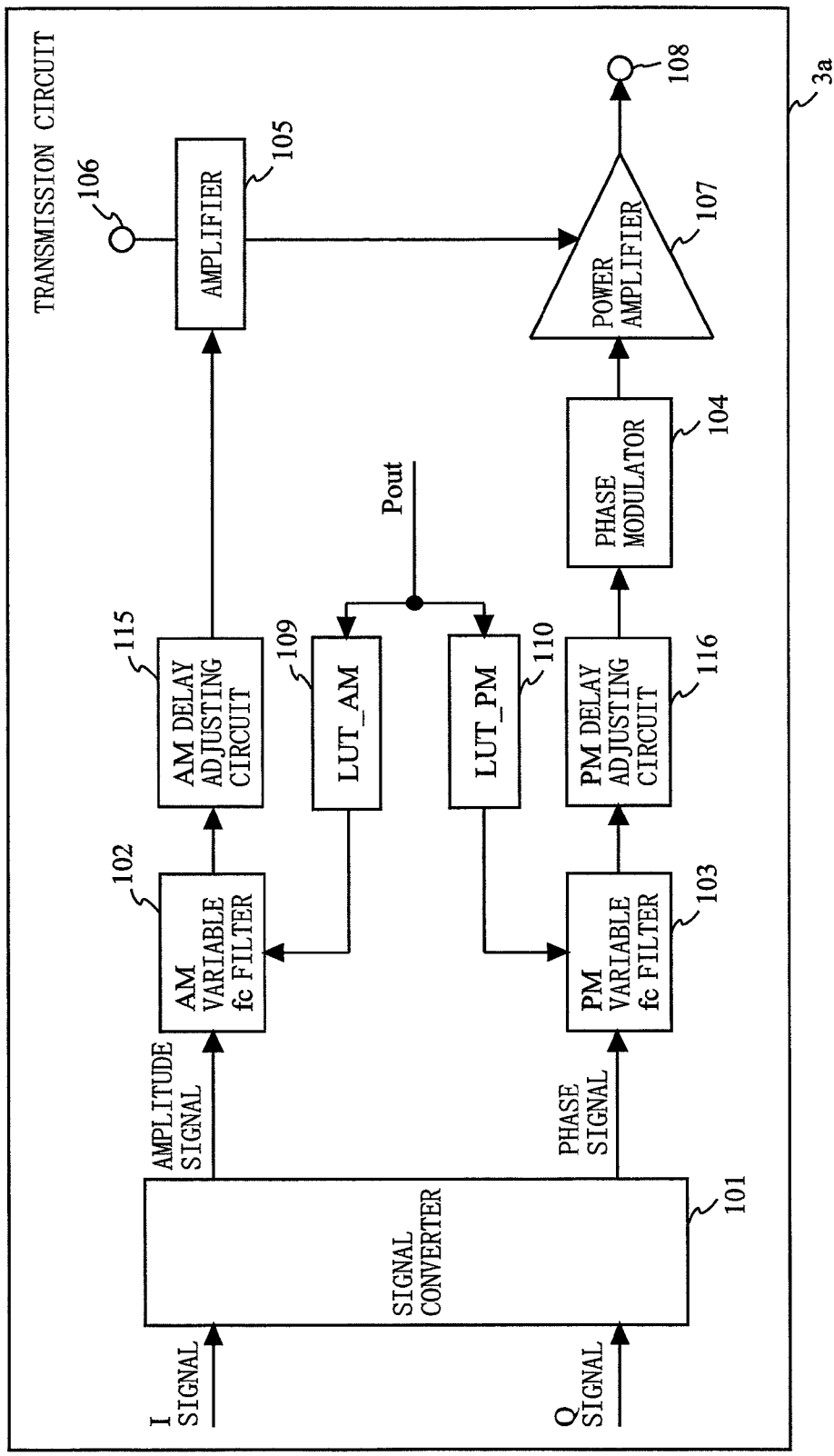
FIG. 9A is a block diagram showing an example of a transmission circuit 3a according to a third embodiment of the present invention.
Figure 9B:
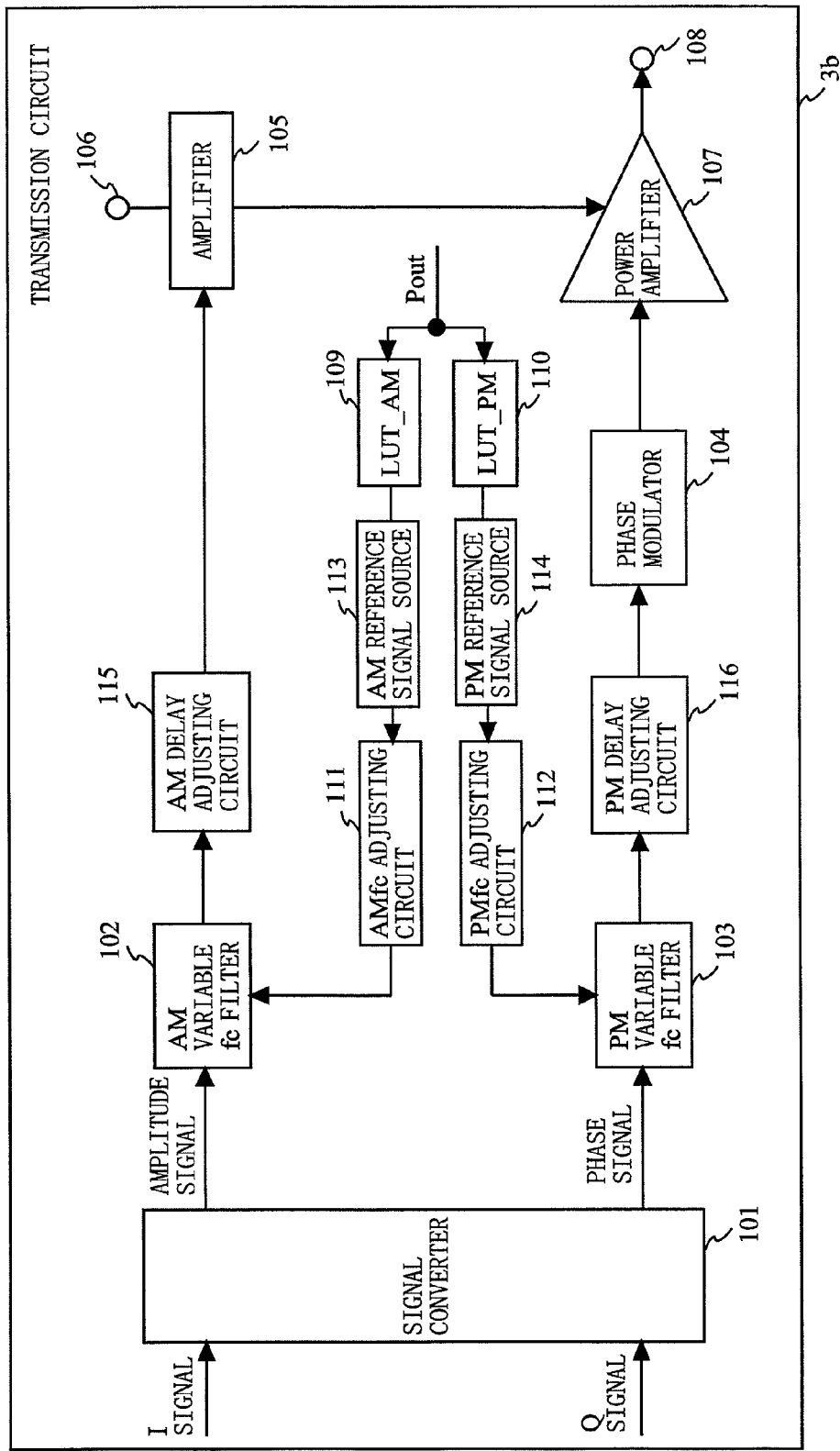
FIG. 9B is a block diagram showing an example of a transmission circuit 3b according to the third embodiment of the present invention.
Figure 9C:
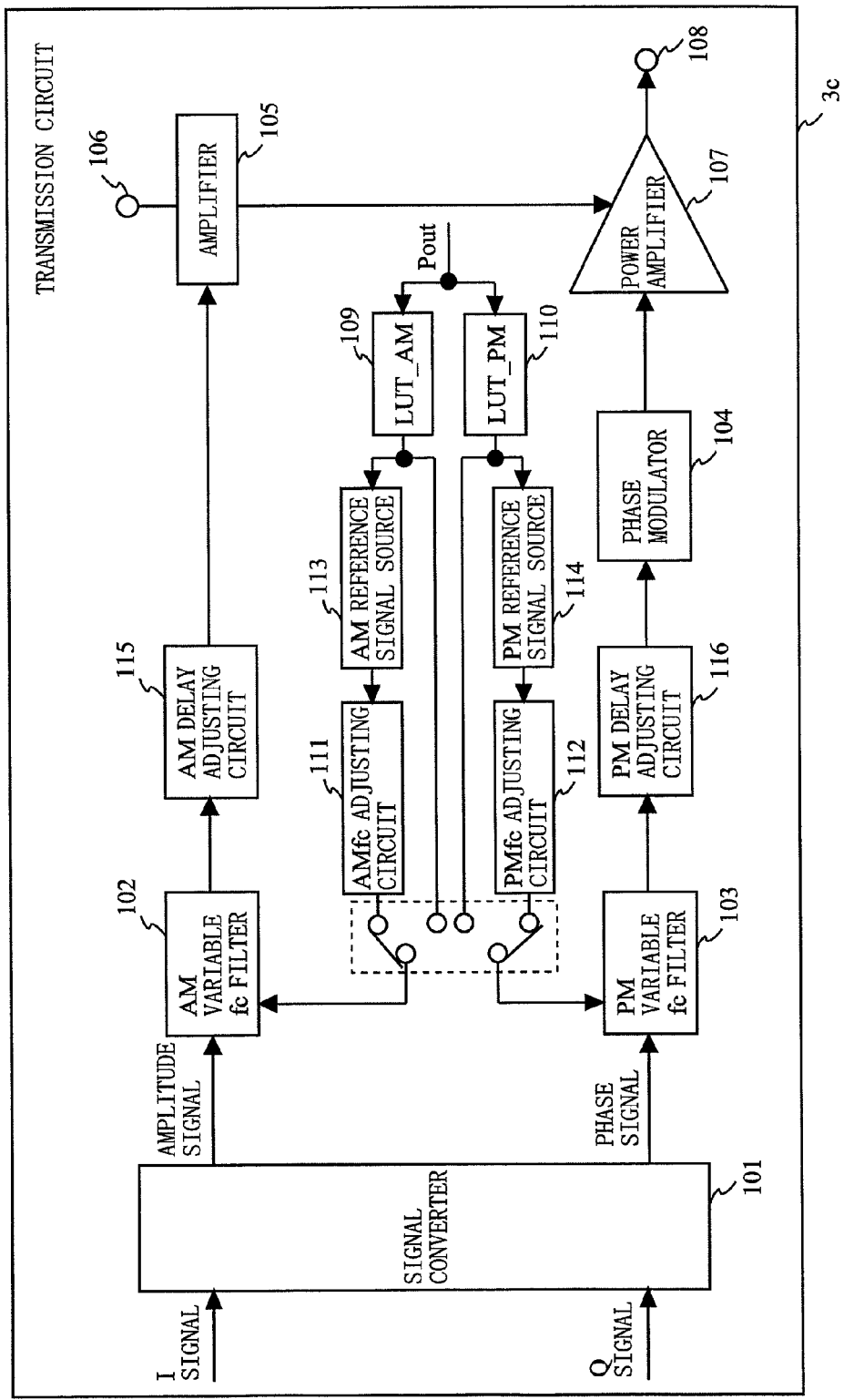
FIG. 9C is a block diagram showing an example of a transmission circuit 3c according to the third embodiment of the present invention.

FIG. 9A is a block diagram showing an example of a transmission circuit 3a according to the third embodiment of the present invention. In FIG. 9A, the transmission circuit 3a further comprises an AM delay adjusting circuit 115 and a PM delay adjusting circuit 116, as compared to the transmission circuit 1 according to the first embodiment (see FIG. 1). FIG. 9B is a block diagram showing an example of a transmission circuit 3b according to the third embodiment of the present invention. In FIG. 9B, the transmission circuit 3b further comprises the AM delay adjusting circuit 115 and the PM delay adjusting circuit 116, as compared to the transmission circuit 2 according to the second embodiment (see FIG. 6). FIG. 9C is a block diagram showing an example of a transmission circuit 3c according to the third embodiment of the present invention. In FIG. 9C, the transmission circuit 3c further comprises the AM delay adjusting circuit 115 and the PM delay adjusting circuit 116, as compared to the transmission circuit 2a according to the second embodiment (see FIG. 8). In these examples, the AM delay adjusting circuit 115 is connected between the AM variable fc filter 102 and the amplifier 105. The PM delay adjusting circuit 116 is connected between the PM variable fc filter 103 and the phase modulator 104.

In FIGS. 9A to 9C, the AM delay adjusting circuit 115 delays, by an optimal delay time, the amplitude signal in accordance with the cutoff frequency of the AM variable fc filter 102, thereby adjusting a delay time of the amplitude signal. The PM delay adjusting circuit 116 delays, by an optimal delay time, the phase signal in accordance with the cutoff frequency of the PM variable fc filter 103, thereby adjusting a delay time of the phase signal. In this manner, the transmission circuits 3a to 3c eliminate the differential delay between the amplitude signal and the phase signal.

Here, the transmission circuits 3a to 3c may each comprise a LUT in which optimal delay times for the amplitude signal are set in accordance with cutoff frequencies of the AM variable fc filter 102, and optimal delay times for the phase signal are set in accordance with cutoff frequencies of the PM variable fc filter 103. In this case, the AM delay adjusting circuit 115 and the PM delay adjusting circuit 116 each can calculate an optimal delay time by referring to the LUT.

Note that, in the transmission circuits 3a to 3c, the AM delay adjusting circuit 115 may be connected at any position as long as the AM delay adjusting circuit 115 is able to adjust the delay time of the amplitude signal. For example, in the transmission circuits 3a to 3c, the AM delay adjusting circuit 115 may be connected between the signal converter 101 and the AM variable fc filter 102. Also, in the transmission circuits 3a to 3c, the PM delay adjusting circuit 116 may be connected at any position as long as the PM delay adjusting circuit 116 is able to adjust the delay time of the phase signal. For example, in the transmission circuits 3a to 3c, the PM delay adjusting circuit 116 may be connected between the signal converter 101 and the PM variable fc filter 103, or between the phase modulator 104 and the power amplifier 107.

Further, the transmission circuits 3a to 3c each may be structured so as to have only one of the AM delay adjusting circuit 115 and the PM delay adjusting circuit 116. Even this structure allows the transmission circuits 3a to 3c to eliminate the differential delay which occurs between the amplitude signal and the phase signal.

Fourth Embodiment

Figure 10:
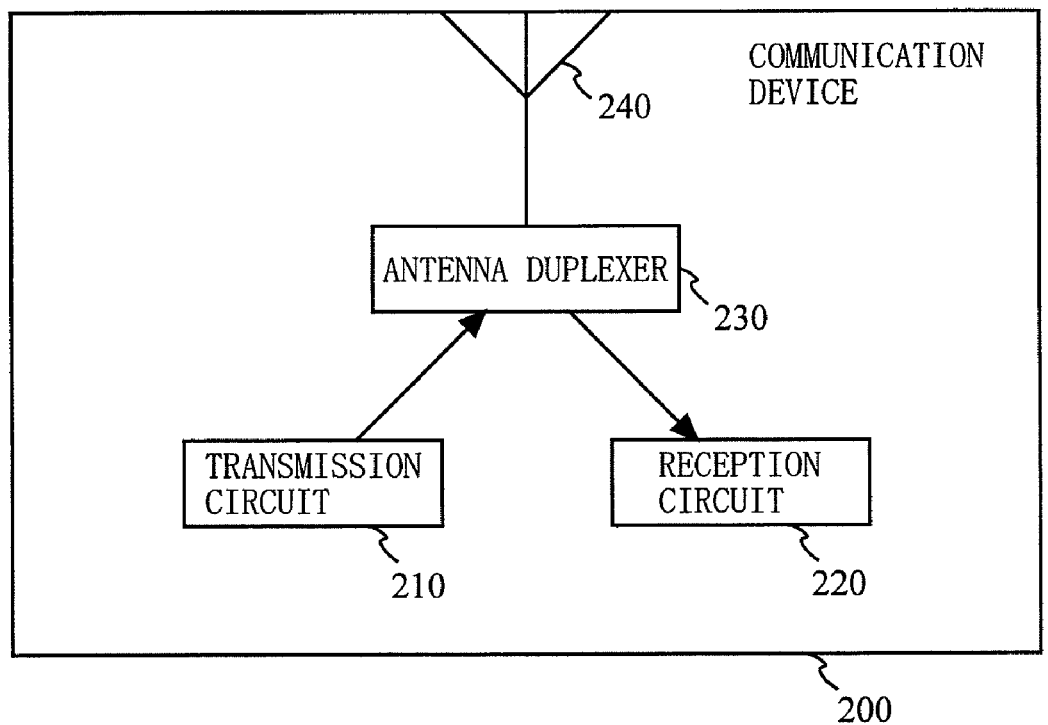
FIG. 10 is a block diagram showing an exemplary structure of a communication device 200 according to a fourth embodiment of the present invention.
Figure 12A:
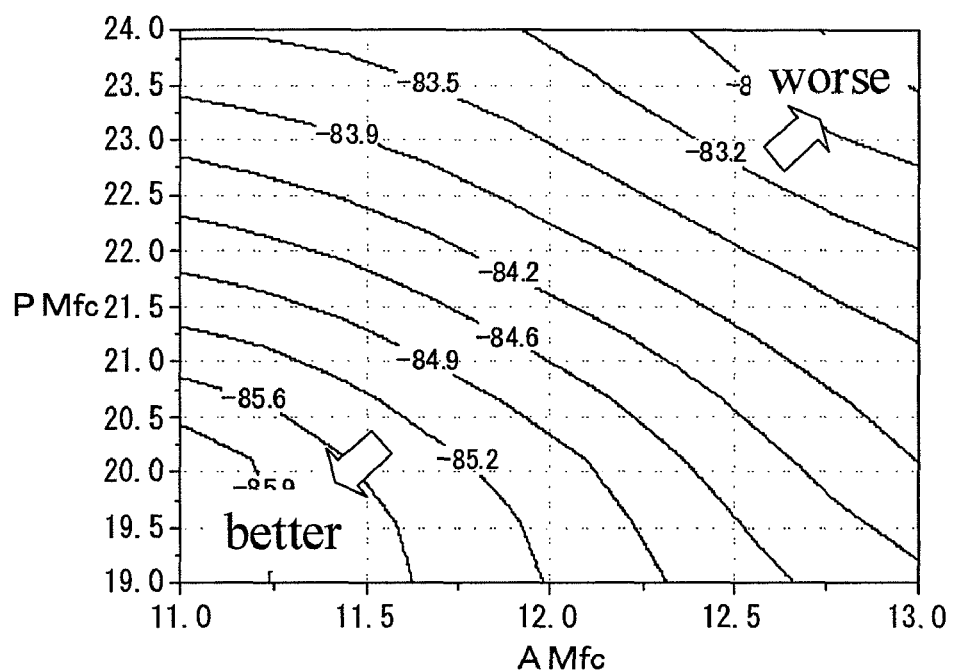
FIG. 12A shows noise contained in a transmission signal outputted from the conventional transmission circuit 500.
Figure 12B:
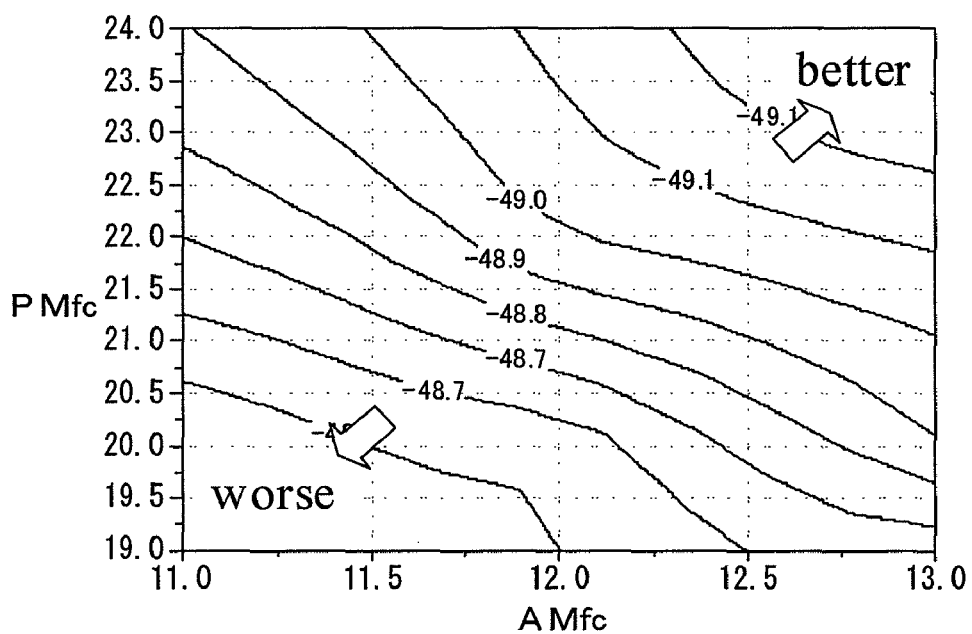
FIG. 12B shows distortion (ACLR at 10 MHz away) of the transmission signal outputted from the conventional transmission circuit 500.

FIG. 10 is a block diagram showing an exemplary structure of a communication device 200 according to a fourth embodiment of the present invention. As shown in FIG. 10, a communication device 200 according to the fourth embodiment comprises a transmission circuit 210, a reception circuit 220, an antenna duplexer 230 and an antenna 240. The transmission circuit 210 is any one of the transmission circuits described in the above first to third embodiments. The antenna duplexer 230 transmits to the antenna 240 a transmission signal outputted from the transmission circuit 210, and prevents the transmission signal from leaking to the reception circuit 220. Also, the antenna duplexer 230 transmits to the reception circuit 220 a reception signal inputted from the antenna 240, and prevents the reception signal from leaking to the transmission circuit 210.

Accordingly, the transmission signal is outputted from the transmission circuit 210, and released from the antenna 240 to the exterior space via the antenna duplexer 230. The reception signal is received by the antenna 240, and then received by the reception circuit 220 via the antenna duplexer 230. The communication device 200 according to the fourth embodiment uses the transmission circuit according to any of the first to third embodiments, thereby securing linearity and a low-noise characteristic of the transmission signal, and also realizing low distortion and low noise as a radio device. Since there is no branching element, such as a directional coupler, on an output of the transmission circuit 210, loss from the transmission circuit 210 to the antenna 240 is reduced, whereby power consumption at the time of transmission is reduced. As a result, the communication device 200 is capable of operating for a long period of time as a radio communication device. Note that, the communication device 200 may have a structure which includes only the transmission circuit 210 and the antenna 240.

The transmission circuits according to the present invention are applicable in, e.g., communication devices such as mobile phones and wireless LAN devices.

While the invention has been described in detail, the foregoing description is in all aspects illustrative and not restrictive. It is understood that numerous other modifications and variations can be devised without departing from the scope of the invention.

What is claimed is:

1. A transmission circuit comprising:
   a signal converting section for converting input signals into an amplitude signal and a phase signal, respectively, and outputting the amplitude signal and the phase signal;
   an AM variable fc filter for removing a high frequency component from the amplitude signal by using an AM cutoff frequency;
   an amplifier for outputting an amplitude component signal which is obtained by amplifying the amplitude signal outputted from the AM variable fc filter;
   a PM variable fc filter for removing a high frequency component from the phase signal by using a PM cutoff frequency;
   a phase modulator for phase-modulating the phase signal outputted from the PM variable fc filter so as to output a high-frequency phase-modulated signal;
   a power amplifier for amplifying the high-frequency phase-modulated signal by using the amplitude component signal outputted from the amplifier, and outputting a resultant signal as a transmission signal;
   wherein the AM variable fc filter is configured to lower the AM cutoff frequency when a power level signal indicating an output power level of the transmission signal is large, and is configured to increase the AM cutoff frequency when the power level signal is small;
   wherein the PM variable fc filter is configured to lower the PM cutoff frequency when the power level signal indicating the output power level of the transmission signal is large, and is configured to increase the PM cutoff frequency when the power level signal is small.

2. The transmission circuit according to claim 1, further comprising:
   a lookup table for prestoring optimal AM cutoff frequencies to be set for the AM variable fc filter, the optimal AM cutoff frequencies respectively corresponding to power level signals, and for prestoring optimal PM cutoff frequencies to be set for the PM variable fc filter, the optimal PM cutoff frequencies respectively corresponding to the power level signals, wherein
   the AM variable fc filter is configured to read an optimal AM cutoff frequency from the lookup table in accordance with the power level signal, and the PM variable fc filter is configured to read an optimal PM cutoff frequency from the lookup table in accordance with the power level signal.

3. The transmission circuit according to claim 2, further comprising:
   an AM fc adjusting circuit for adjusting a characteristic variation of the AM variable fc filter;
   a PM fc adjusting circuit for adjusting a characteristic variation of the PM variable fc filter;
   an AM reference signal source for generating a reference signal in accordance with the AM cutoff frequency read from the lookup table; and
   a PM reference signal source for generating a reference signal in accordance with the PM cutoff frequency read from the lookup table, wherein
   the AMfc adjusting circuit is configured to adjust the AM cutoff frequency of the AM variable fc filter so as to be same as a frequency of the reference signal generated by the AM reference signal source, and
   the PMfc adjusting circuit is configured to adjust the PM cutoff frequency of the PM variable fc filter so as to be same as a frequency of the reference signal generated by the PM reference signal source.

4. The transmission circuit according to claim 3, wherein the AMfc adjusting circuit comprises:
   a referential variable fc filter for removing, using a particular cutoff frequency, a high frequency component from the reference signal generated by the AM reference signal source;
   a phase comparator for comparing phases of the reference signal generated by the AM reference signal source and an output signal of the referential variable fc filter, and outputting a comparison result as a control signal for controlling the particular cutoff frequency of the referential variable fc filter; and
   an LPF for outputting the control signal from the phase comparator to the referential variable fc filter, wherein
   the AM variable fc filter and the referential variable fc filter are provided on a same chip, and
   the AMfc adjusting circuit is configured to use the control signal outputted from the LPF, thereby controlling the AM cutoff frequency of the AM variable fc filter.

5. The transmission circuit according to claim 3, wherein the PMfc adjusting circuit comprises:
   a referential variable fc filter for removing, using a particular cutoff frequency, a high frequency component from the reference signal generated by the PM reference signal source;
   a phase comparator for comparing phases of the reference signal generated by the PM reference signal source and an output signal of the referential variable fc filter, and outputting a comparison result as a control signal for controlling the particular cutoff frequency of the referential variable fc filter; and
   an LPF for outputting the control signal from the phase comparator to the referential variable fc filter, wherein
   the PM variable fc filter and the referential variable fc filter are provided on a same chip, and
   the PMfc adjusting circuit is configured to use the control signal outputted from the LPF, thereby controlling the PM cutoff frequency of the PM variable fc filter.

6. The transmission circuit according to claim 3, wherein when the power level signal is smaller than a predetermined threshold value, the AMfc adjusting circuit, the PMfc adjusting circuit, the AM reference signal source and the PM reference signal source are prevented from operating.

7. The transmission circuit according to claim 1, further comprising an AM delay adjusting circuit for adjusting a delay time of the amplitude signal.

8. The transmission circuit according to claim 1, further comprising a PM delay adjusting circuit for adjusting a delay time of the phase signal.

9. A communication device comprising:
   a transmission circuit for generating a transmission signal; and
   an antenna for outputting the transmission signal generated by the transmission circuit, wherein
   the transmission circuit is the transmission circuit according to claim 1.

10. The communication device according to claim 9, further comprising:
    a reception circuit for processing a reception signal received from the antenna; and
    an antenna duplexer for outputting the transmission signal generated by the transmission circuit to the antenna, and outputting the reception signal received from the antenna to the reception circuit.

* * * * *